United States Patent
Minkkinen et al.

(10) Patent No.: US 11,548,198 B2
(45) Date of Patent: Jan. 10, 2023

(54) SINGLE-SCREW EXTRUDER WITH HOLLOW ROTOR MEMBER

(71) Applicant: TEKNOLOGIAN TUTKIMUSKESKUS VTT OY, Espoo (FI)

(72) Inventors: Hannu Minkkinen, Tampere (FI); Antti Ojala, Tampere (FI); Kirsi Immonen, Tampere (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 28 days.

(21) Appl. No.: 16/328,022

(22) PCT Filed: Aug. 25, 2017

(86) PCT No.: PCT/FI2017/050598
§ 371 (c)(1),
(2) Date: Feb. 25, 2019

(87) PCT Pub. No.: WO2018/037164
PCT Pub. Date: Mar. 1, 2018

(65) Prior Publication Data
US 2019/0184621 A1    Jun. 20, 2019

(30) Foreign Application Priority Data
Aug. 26, 2016 (FI) ..................................... 20165640

(51) Int. Cl.
*B29C 48/395* (2019.01)
*B29B 7/42* (2006.01)
(Continued)

(52) U.S. Cl.
CPC ............ *B29C 48/397* (2019.02); *B29B 7/425* (2013.01); *B29B 7/429* (2013.01); *B29B 7/90* (2013.01);
(Continued)

(58) Field of Classification Search
CPC ..... B29C 48/59; B29C 48/397; B29C 48/681; B29C 48/56; B29C 48/625; B29C 48/688;
(Continued)

(56) References Cited

U.S. PATENT DOCUMENTS 3,314,108 A    4/1967  Wienand et al.
3,701,512 A *  10/1972 Schippers .............. B29C 48/65
                                                  366/89
(Continued)

FOREIGN PATENT DOCUMENTS

CN           2200529     6/1995
CN          101786326    7/2010
(Continued)

OTHER PUBLICATIONS

International Search Report for PCT/FI2017/050598, dated Nov. 23, 2017, 5 pages.
(Continued)

*Primary Examiner* — Seyed Masoud Malekzadeh
(74) *Attorney, Agent, or Firm* — Nixon & Vanderhye PC

(57) ABSTRACT

A single-screw extruder (100), and a method. The extruder (100) comprises—a cylindrical rotor member (1) having diameter (D) and length (L) and comprising a feeding zone (14), —the rotor member (1) arranged in a barrel (2), —the cylindrical surface of the rotor member (1) carrying cavity/cavities and/or projection(s) (5) arranged in helically extending rows, —the helically extending row(s) of the rotor member (1) having a pitch (P) and depth (d) in the feeding zone (14) of the rotor member, and the extruder (100) further
(Continued)

comprising—a drive system (4) for the rotation of the rotor member (1) in the barrel (2). The relation of the depth (d) to the diameter (D) of the rotor member, i.e. d:D, is not more than 1:20, and the relation of the pitch (P) of the rotor member to the diameter (D) of the rotor member, i.e. P:D, is not more than 1:4.

18 Claims, 4 Drawing Sheets

(51) Int. Cl.
| | | |
|---|---|---|
| B29B 7/90 | (2006.01) | |
| B29C 48/68 | (2019.01) | |
| B29C 48/56 | (2019.01) | |
| B29C 48/59 | (2019.01) | |
| B29C 48/51 | (2019.01) | |
| B29C 48/625 | (2019.01) | |
| B29C 48/685 | (2019.01) | |

(52) U.S. Cl.
CPC ............. *B29C 48/56* (2019.02); *B29C 48/59* (2019.02); *B29C 48/681* (2019.02); *B29C 48/51* (2019.02); *B29C 48/625* (2019.02); *B29C 48/688* (2019.02)

(58) Field of Classification Search
CPC ..... B29C 498/397; B29B 7/425; B29B 7/429; B29B 7/40; B29B 7/42; B29B 7/428
See application file for complete search history.

(56) References Cited

U.S. PATENT DOCUMENTS

| | | | | |
|---|---|---|---|---|
| 4,025,274 A * | 5/1977 | Uemura | ............... | B29C 48/60 425/207 |
| 4,253,771 A | 3/1981 | Renk | | |
| 4,321,229 A * | 3/1982 | Blakeslee, III | ....... | B29C 48/022 425/168 |
| 4,329,313 A * | 5/1982 | Miller | ............... | B29C 48/535 366/89 |
| 4,350,657 A * | 9/1982 | Jones | ............... | B29C 48/397 366/89 |
| 4,423,960 A * | 1/1984 | Anders | ............... | B29C 48/40 366/85 |
| 4,659,300 A * | 4/1987 | Schwarz | ............... | B29C 48/501 366/89 |
| 4,729,662 A * | 3/1988 | O'Brien | ............... | B29C 48/65 366/89 |
| 4,786,181 A * | 11/1988 | O'Brien | ............... | B29C 48/66 366/89 |
| 4,994,223 A * | 2/1991 | Hestehave | ............ | B29C 48/395 425/207 |
| 5,156,790 A * | 10/1992 | Cucchisi | ............... | B29C 48/022 264/211.21 |
| 5,965,173 A * | 10/1999 | Goldup | ............... | B29C 48/67 366/322 |
| 6,080,346 A * | 6/2000 | Jack | ............... | B29C 48/285 425/382.2 |
| 6,328,919 B1 * | 12/2001 | Pham | ............... | B29C 48/76 425/208 |
| 2002/0136084 A1 * | 9/2002 | Derezinski | ............ | B29C 48/767 366/89 |
| 2007/0104021 A1 * | 5/2007 | Okabe | ............... | B29C 45/60 366/89 |
| 2012/0300572 A1 * | 11/2012 | Sant'Elia | ............... | B29C 48/65 366/88 |
| 2013/0251927 A1 * | 9/2013 | Kouno | ............... | B29B 7/429 525/190 |
| 2015/0367532 A1 * | 12/2015 | Pohl | ............... | B29C 48/387 366/79 |
| 2016/0176070 A1 * | 6/2016 | James | ............... | B01J 20/226 556/37 |
| 2016/0279841 A1 * | 9/2016 | Fitzpatrick | ............... | H02K 7/14 |
| 2017/0129156 A1 * | 5/2017 | Letocart | ............... | B29C 48/625 |

FOREIGN PATENT DOCUMENTS

| | | | |
|---|---|---|---|
| CN | 104015334 | | 9/2014 |
| CN | 104015335 | | 9/2014 |
| CN | 105313304 | | 2/2016 |
| DE | 42 14 976 | | 11/1993 |
| DE | 103 57 377 | | 7/2005 |
| GB | 362 280 | | 12/1931 |
| GB | 1059595 | | 2/1967 |
| GB | 1 170 430 | | 11/1969 |
| JP | 52-51454 | | 4/1977 |
| JP | 07-080834 | | 3/1995 |
| JP | 07100873 A | * | 4/1995 ............ B29C 48/53 |
| JP | 08-502419 | | 3/1996 |
| JP | 2006-103044 | | 4/2006 |
| WO | 97/37830 | | 10/1997 |

OTHER PUBLICATIONS

Written Opinion of the ISA for PCT/FI2017/050598, dated Nov. 23, 2017, 7 pages.
Search Report for FI20165640, dated Feb. 17, 2017, 1 page.
Office Action for FI20165640, dated Feb. 17, 2017, 6 pages.
Office Action for FI20165640, dated Mar. 13, 2018, 5 pages.
Office Action issued in FI Appln. No. 20165640 dated Nov. 5, 2020.
Wagner Jr et al, "Screw Design" *Extrusion: The Definite Processing Guide and Handbook*, Second Edition, Elsevier Inc., ISBN 978-1-4377-3481-2, pp. 71-74 (2014).
Office Action issued in CN Appln. No. 201780051933.5 dated Sep. 24, 2020 (w/ translation).
Notification of Second Office Action dated May 19, 2021 in corresponding Chinese Application No. 201780051933.5, 6 pages.
Office Action dated Jun. 18, 2021 in corresponding Japanese Application No. 2019-510876, 3 pages.
Office Action dated Jan. 14, 2022 in corresponding Japanese Application No. 2019-510876 (with English translation), 7 pages.

* cited by examiner

SINGLE-SCREW EXTRUDER WITH HOLLOW ROTOR MEMBER

This application is the U.S. national phase of International Application No. PCT/FI2017/050598 filed 25 Aug. 2017, which designated the U.S. and claims priority to FI Patent Application No. 20165640 filed 26 Aug. 2016, the entire contents of each of which are hereby incorporated by reference.

BACKGROUND

The invention relates to a single-screw extruder, comprising a cylindrical rotor member having diameter and length and comprising a feeding zone, the rotor member arranged in a barrel, the cylindrical surface of the rotor member carrying cavity/cavities and/or projection(s) arranged in helically extending rows, the helically extending row(s) of the rotor member having a pitch and depth in the feeding zone of the rotor member, and the extruder further comprising a drive system for the rotation of the rotor member in the barrel.

The invention further relates to a method for manufacturing a rotor member of a single screw extruder. The demand for processing light materials in their density, heterogeneous materials, such as materials comprising fibres, waste/recycled plastic, is continuously growing.

A problem with this type of materials is that they are extremely difficult to be fed in commonly known extruders and compounding devices.

This is due to the fact that traditional extruders and compounding devices are designed for processing of homogeneous and relative dense materials, e.g. plastic granulates.

The main challenge in the existing extruders and compounding devices is the feeding of materials in the device: the size of the feed opening is too small for effective feeding of the materials mentioned above. This challenge could be solved by increasing the size of the feed opening. However, this would also increase the overall dimensions of the device, such as diameter of the screw or rotor. This would lead to devices the price of which is unfeasible for many applications and they also need more material to feed in so that they would work optimally.

BRIEF DESCRIPTION

Viewed from a first aspect, there can be provided a single-screw extruder, comprising a cylindrical rotor member having diameter and length and comprising a feeding zone, the rotor member arranged in a barrel, the cylindrical surface of the rotor member carrying cavity/cavities and/or projection(s) arranged in helically extending rows, the helically extending row(s) of the rotor member having a pitch and depth in the feeding zone of the rotor member, and the extruder further comprising a drive system for the rotation of the rotor member in the barrel, wherein the relation of the depth to the diameter of the rotor member, i.e. d:D, is not more than 1:20, and the relation of the pitch of the rotor member to the diameter of the rotor member, i.e. P:D, is not more than 1:4.

Thereby a single-screw extruder possessing outstanding process properties for processing heterogeneous materials may be achieved.

Viewed from a further aspect, there can be provided a method for manufacturing a rotor member of a single screw extruder, the method comprising: providing a hollow bar, manufacturing cavity/cavities and/or projection(s) arranged in helically extending rows on the outer surface of the hollow bar such that the relation of the depth of the rows to the diameter of the hollow bar in the feeding zone of the rotor member being manufactured, i.e. d:D, is not more than 1:20 and that the relation of the pitch of the hollow bar to the diameter of the hollow bar, i.e. P:D, is not more than 1:4. Thereby a method for manufacturing a rotor member of a single-screw extruder in an economically advantageous way may be achieved.

The extruder and the method are characterized by what is stated in the characterising parts of the independent claims. Some other embodiments are characterized by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

BRIEF DESCRIPTION OF FIGURES

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figure 1:
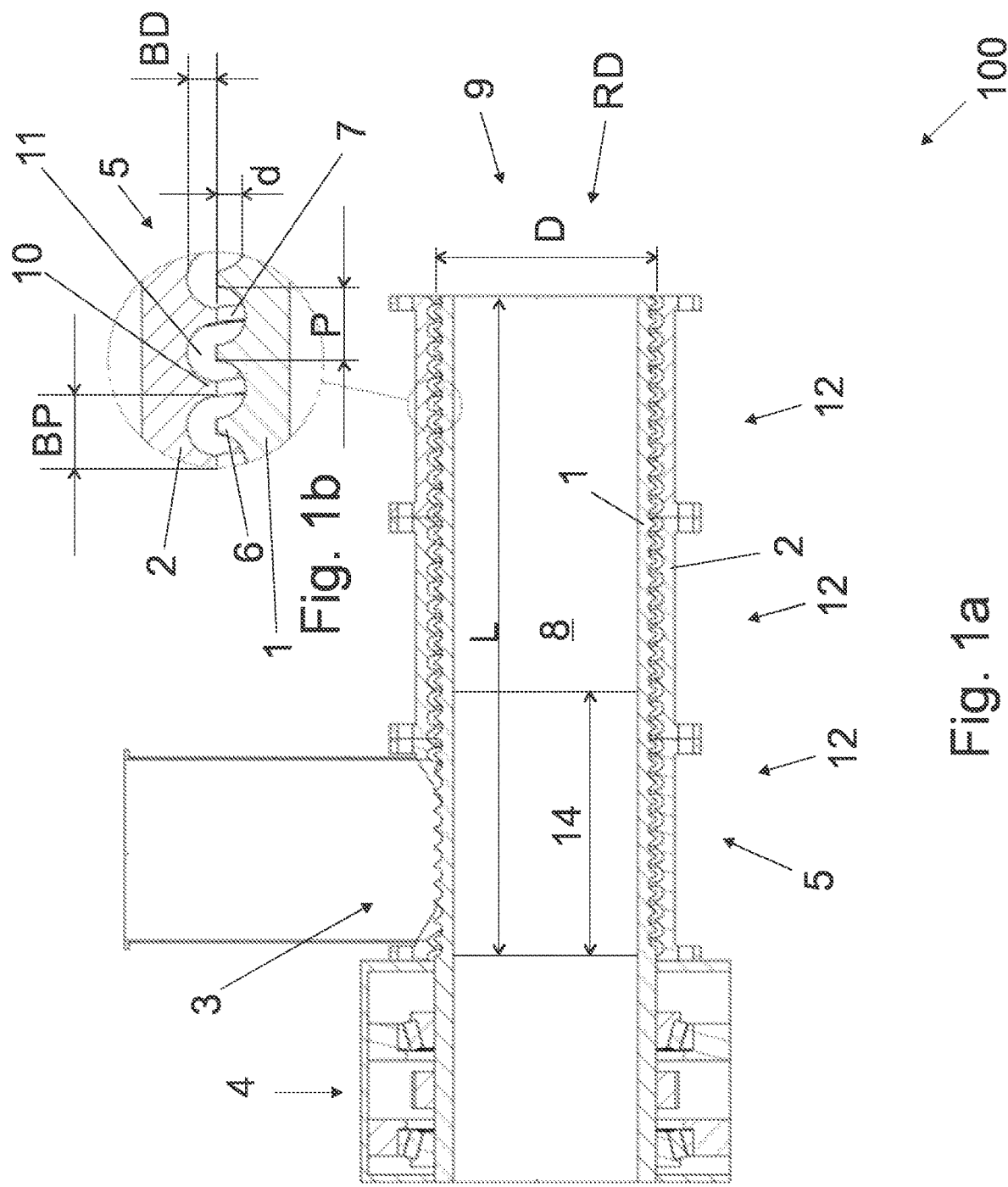
FIG. 1a is a schematic side view of an extruder in partial cross-section.
FIG. 1b is a schematic view of a detail of the extruder shown in FIG. 1a in partial cross-section.

FIG. 1a is a schematic side view of a screw extruder in partial cross-section, and FIG. 1b is a schematic view of a detail of the extruder shown in FIG. 1a in partial cross-section. The term "screw extruder" or "extruder" means here not only extruders for plastic extrusion but also compounding extruders, and extruders for other materials that may be in flowable form or that may be rendered in flowable form, such as foodstuff, animal feed, fuels, raw materials, recyclable materials etc. According to an aspect, the embodiments of the extruder are capable to process any kind of materials that the combination of rotating and stationary geometries of the rotor and barrel can transfer through the extruder. The form of the material does change when passing through the extruder, i.e. material or mixture of materials may, for instance, compress, compact, consolidate, grind, break apart, melt, react, decompose, and/or degrade.

According to an aspect, the extruder is used for compacting and/or granulating plastic films.

According to an aspect, the extruder is used for compacting and/or compounding of bio-based fibres, especially long bio-based fibres.

According to an aspect, the extruder is used for processing animal feed products.

According to an aspect, the extruder is used for compacting and/or granulating plastic-containing low-weight and varying packing materials.

The extruder 100 is a single-screw extruder comprising a cylindrical rotor member 1, a barrel 2, a feed opening 3, and a drive system 4 for the rotation of the rotor member 1 in the barrel 2.

The rotor member 1 has diameter D and length L. In an embodiment, the relation of the length to the diameter, i.e. L:D, is in range of 2:1 to 4:1.

The cylindrical outer surface of the rotor member 1 comprises projections 5 that realizes a screw thread comprising at least one screw flight 6 and at least one screw channel 7 between the at least one screw flight 6.

The screw thread constitutes a structure that transfers the material to be processed in the barrel from the feed opening 3 towards the outlet 9 while the rotor member 1 is rotating in the barrel 2. In an embodiment, the profile of the screw thread is invariable. In another embodiment, the profile of the screw thread is variable such that the volume of the screw channel decreases towards the outlet 16 of the extruder. In an embodiment, the depth d of the cavity/cavities and/or projection(s) 5 arranged on the surface of rotor is arranged to decrease after feed zone (10).

The decreasing of the screw channel volume causes a compression ratio which is typically 1:2 to 1:4. The profile may change step by step, or it may comprise at least one section where the profile changes rapidly from one profile to another profile.

The screw flight 6 has pitch P and the screw channel 7 has depth d in the feeding zone 14 of the rotor member 1. The "feeding zone" means that part of the rotor member 1 that is directly under the feed opening 3 and one to five lap(s) of the flight 6 following the feed opening.

According to an aspect, the relation of the depth d to the diameter D, i.e. d:D, is not more than 1:20, and the relation of the pitch P to the diameter D, i.e. P:D, is not more than 1:4.

An advantage is that the volume of the screw channel 7 is very low compared to the screw diameter D. Thus it is possible to provide the extruder 100 with a very large feed opening 3 compared to the volume of the screw channel 7. Following this, light density and/or heterogeneous materials, such as materials comprising fibres, waste/recycled plastic, can be fed in the extruder 100 in amounts sufficient to fill optimally the screw channel 7.

Another advantage is that the low volume compared to the screw diameter D decreases power requirement of the extruder.

In an embodiment, d:D is in range of 1:300 to 1:20 (in the feeding zone 14 of the rotor member 1).

An advantage is that the temperature of the material to be processed in the screw channel 7 may be controlled very precisely due to large surface area of the screw channel compared to volume of the material, and thus e.g. materials or processes highly sensitive to temperature may be processed by the extruder.

In an embodiment, P:D is in range of 1:60 to 1:4.

An advantage is that the material to be processed may be transferred towards the outlet 7 by low power usage.

In an embodiment, the rotor member 1 realizes equation $$CL \cdot d \leq RD \cdot 0.01, \text{ wherein}$$

CL=CL=channel length measured in direction of length (L) of the rotor member 1, d=channel depth measured in radial direction of the rotor member 1, and RD=cross-sectional area of the rotor member, including also the cross-sectional area of the channel 8.

An advantage is that the volume of the screw channel 7 is very low compared to the screw diameter D, and thus easily filled with the material to be processed due to a large feed opening 3.

For instance, the diameter of the rotor member 1 may be 350 mm whereas the length following the feed opening is 400 mm.

In an embodiment, the feed opening 3 or the feeding zone 14 comprises shearing or cutting means for reducing the particle size of the material being fed in the extruder 100. This means may comprise e.g. cutting teeth arranged on the rotor member 1 and counterpart(s) arranged in the barrel 2.

According to an aspect, the rotor member 1 is hollow. In an embodiment, the rotor member comprises a cylindrical channel 8, such as circular cylinder, the diameter of which is at least 75%, preferably 80 to 85%, of the diameter D of the rotor member. This means that the diameter D of the rotor member may be increased compared to the known rotor members without increasing the weight and expenses thereof.

In an embodiment, the rotor member comprises one screw flight. In another embodiment, the rotor member comprises two, or even more, screw flights.

Thanks to the large diameter of the rotor member 1, the drive system 4 may be construed to transmit high torques in the rotor member 1. Also the structure of the rotor member 1 may stand high torques without risk for damages.

The extruder 100 may be realized many alternative ways. For instance, in an embodiment the rotor member 1 comprises helically extending rows of plurality of separate cavities, instead of the screw thread. Said cavities constitute a structure that transfers the material to be processed in the barrel from the feed opening 3 towards the outlet 9.

The shape of the cavities may be e.g. dome, hemispheric, a section or calotte of tear-drop, oval or combinations thereof.

According to an aspect, the relation of the depth d to the diameter D in the feeding zone 14 of the rotor member 1, i.e. d:D, is not more than 1:20, and the relation of the pitch P to the diameter D, i.e. P:D, is not more than 1:4.

An advantage is that the volume of the cavities is very low compared to the screw diameter D, and thus light density and/or heterogeneous materials, such as materials comprising fibres, waste/recycled plastic, can be fed in the extruder 100 in amounts sufficient to fill optimally the volume between the rotor member 1 and the barrel 2.

In an embodiment, d:D is in range of 1:300 to 1:20.

In an embodiment, P:D is in range of 1:60 to 1:4.

In another embodiment, the rotor member 1 comprises projections that realize helically extending rows of plurality of discrete projections, the row comprising pitch P.

According to an aspect, the relation of the depth d, or height of the projections, to the diameter D, i.e. d:D, is not more than 1:20, and the relation of the pitch P to the diameter D, i.e. P:D, is not more than 1:4.

In an embodiment, d:D is in range of 1:300 to 1:20.

In an embodiment, P:D is in range of 1:60 to 1:4.

According to an aspect, the cylindrical inner surface of the barrel 2 may comprise barrel cavity/cavities and/or projection(s). In an embodiment, said barrel cavity/cavities and/or projection(s) are arranged in helically extending rows. In another embodiment, the barrel cavity/cavities and/or projection(s) are arranged parallel with longitudinal axis of the rotor member 1. In still another embodiment, the barrel cavity/cavities and/or projection(s) are arranged perpendicular with the longitudinal axis of the rotor member 1.

In an embodiment, the barrel 2 comprises a barrel screw thread comprising at least one barrel flight 10 and at least one barrel channel 11 between the at least one flight, the barrel flight having a barrel pitch (BP) and the barrel channel having a barrel depth (BD).

An advantage is that transfer of the material to be processed towards the outlet 9 may be enhanced.

In another embodiment, the cavities arranged in the barrel 2 realize helically extending rows of plurality of separate cavities.

An advantage is that the mixing and blending properties of the extruder may be enhanced.

The cavities arranged in the barrel 2 may be invariable in their shape and size in all the length of the barrel they exist. In another embodiment, the barrel 2 may comprise variable sized and/or shaped cavities.

In an embodiment, the barrel cavity/cavities and/or projection(s) (5) are not continuous, such that there are several cavities or grooves side by side.

Figure 2:
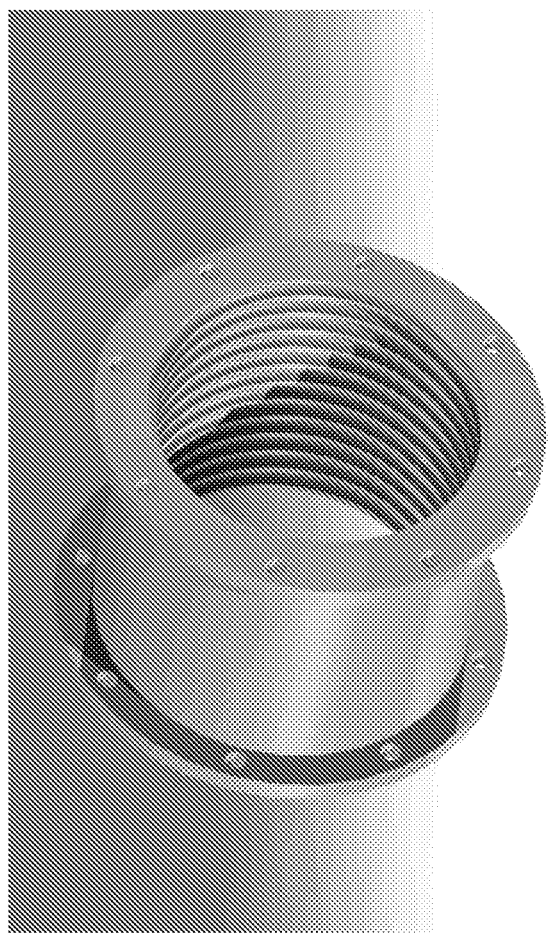
FIG. 2 is a schematic view of a piece of an extruder barrel.

FIG. 2 is a schematic view of a piece of an extruder barrel. According to an aspect, the barrel 2 is construed from two or more barrel modules 12 that are separately manufactured and then connected consecutively.

An advantage is that the barrel cavity/cavities and/or projection(s), such as barrel screw thread comprising at least one barrel flight 10 and at least one barrel channel 11, may be manufactured in short pieces of the barrel more easily into short and large in diameter barrel module 12 than they would be manufactured in one monolithic barrel having equal length. It is to be noted, however, that the barrel 2 may also be manufactured in one piece. In the latter case, the barrel cavity/cavities and/or projection(s) can still be manufactured extremely easily due to high D:L relationship of the extruder.

Figure 3:
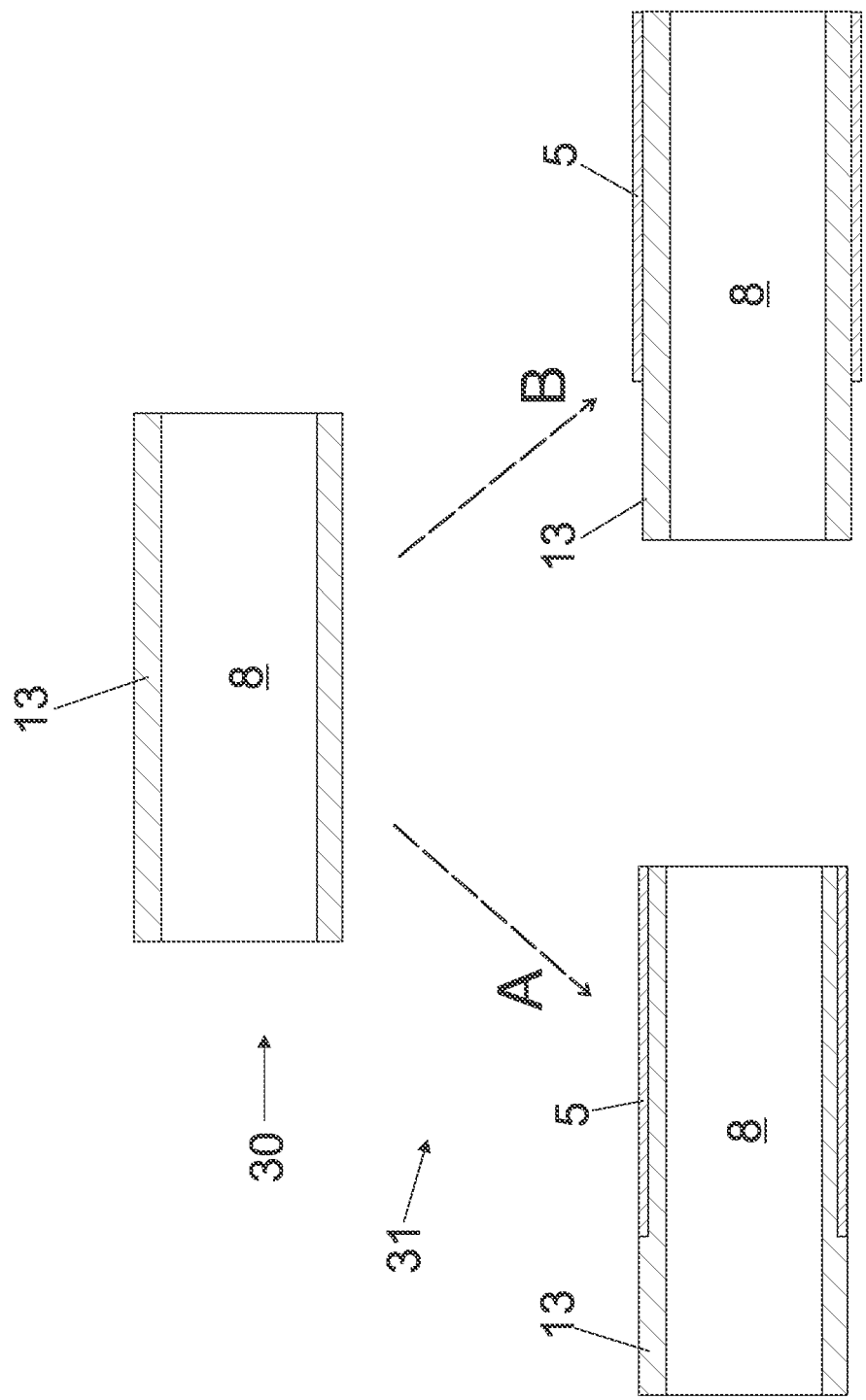
FIG. 3 is a schematic illustration of a method for manufacturing a rotor member of an extruder or compounding device.

FIG. 3 is a schematic illustration of a method for manufacturing a rotor member of an extruder.

As a first step, the method comprises providing 30 a hollow bar 13. The hollow bar comprises a cylindrical channel 8, the diameter of which is at least 75%, preferably 80 to 85%, of the outer diameter of the hollow bar 13.

In an embodiment, the hollow bar 13 is a metal tube, such as steel tube or stainless steel tube.

The method further comprises a step 32 for manufacturing cavity/cavities and/or projection(s) arranged in helically extending rows on the outer surface of the hollow bar 13.

In an embodiment, the manufacturing of the cavity/cavities and/or projection(s) comprises removing material from the hollow bar 13. This embodiment is shown as alternative "A" in FIG. 3. The material may be removed by methods and means known per se, e.g. milling, lathing, peeling, cutting, electroerosion etc.

In another embodiment, the manufacturing of the cavity/cavities and/or projection(s) comprises adding material on the hollow bar 13. This embodiment is shown as alternative "B" in FIG. 3. The material may be added by methods and means known per se, e.g. welding, etc.

In an embodiment, there is manufactured a screw thread comprising at least one screw flight having pitch (P) and the screw channel having depth (d).

In another embodiment, there are manufactured rows of plurality of separate cavities on the outer surface of the hollow bar. The rows have pitch (P) and the cavities have depth (d).

Regardless of the method being used for manufacturing of the cavity/cavities and/or projection(s), the relation of the depth (d) of the rows to the diameter (D) of the rotor member, i.e. d:D, is not more than 1:20 and the relation of the pitch (P) of the rotor member to the diameter (D) of the rotor member, i.e. P:D, is not more than 1:4.

In an embodiment, d:D is in range of 1:300 to 1:20, typically 100:1 to 1:20.

The method may also comprise additional steps, such as cutting the hollow bar 13 in a suitable length, manufacturing of features for the drive system 4, finishing and trimming steps etc.

Figure 4:
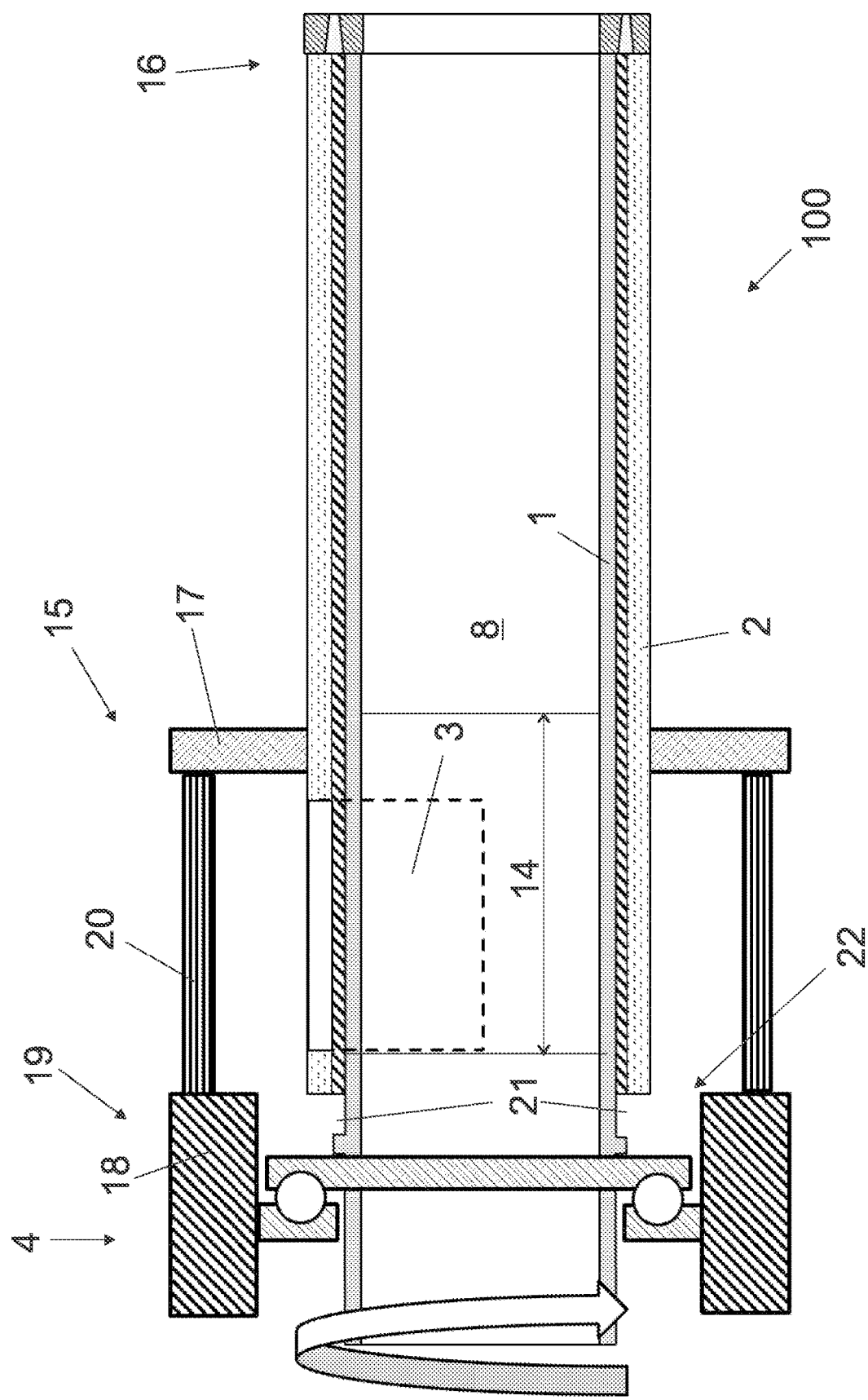
FIG. 4 is a schematic side view of another extruder in partial cross-section.

FIG. 4 is a schematic side view of another extruder in partial cross-section. The feed opening 3 is substantially big comparing to the motor power and capacity of the extruder and the depth of the rotor cavities. The projected area of the feed opening could be 20 to 200 times the size of a feed opening of a conventional plastic single screw extruder with the same rotor motor power.

According to an aspect, the projected area of the feed opening is about 15 $cm^2$-150 $cm^2$ per kilowatt (kW) of rotor motor power, preferably about 30 $cm^2$-100 $cm^2$. In an embodiment, the projected area of the feed opening is about 50 $cm^2$/kW. In an embodiment, the feed opening 3 is cut to the halfway of the diameter of the barrel 2, i.e. approximately D/2. Thus the feed opening 3 potentially weakens the structure of the barrel 2 such an extent, that the barrel 2 is not able to carry the load caused during an extrusion process. Especially when the diameter of the barrel is large and the barrel is short, the axial forces tend to bend the barrel at the feeding zone 14.

In an embodiment, the barrel 2 is supported by a support structure 15 that lies outside of the barrel 2. The support structure 15 comprises a first support part 17 that is attached to a section of the barrel 2 between the feed opening 3 and the discharge end 16 of the barrel, a second support part 18 attached to the drive system side 19 of the extruder, and a load transmit structure 20 connecting the first support part 17 to the second support part 18. In the embodiment shown in FIG. 4, the second support part 18 has been fixed to a bearing housing 22 that covers the drive system 4. The load transmit structure 20 may be composed of one or more beam(s), plate structure or trussed construction, for instance.

The support structure 15 bears a part of the loads and stresses caused in an extrusion process and prevents the structure of the extruder from bending.

In an embodiment, there is an axial slot 21 arranged between the feeding zone 14 of the barrel and the bearing housing 22 of the extruder for receiving material (if any) flowing from the feeding zone backwards. Thus the axial slot 21 is to prevent the material to enter in the bearing housing 22. Instead, the material will drop through the slot in a room where it does not cause any problems to the extruder or the extrusion process.

In an embodiment, the barrel 2 is totally separated from the bearing housing 22, i.e. the axial slot 21 extends 360° around longitudinal axle of the extruder.

In another embodiment, there are plurality of axial slots 21 that are separated by short sections of material. The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS 1 rotor member
2 barrel
3 feed opening
4 drive system
5 projection or cavity
6 screw flight
7 screw channel
8 channel
9 outlet
10 barrel flight
11 barrel channel
12 barrel module
13 hollow bar
14 feeding zone
15 barrel support structure
16 extruder outlet end
17 first support part
18 second support part
19 drive system side
20 load transmit structure
21 axial slot
22 bearing housing
30 providing a hollow bar
31 manufacturing cavity/cavities and/or projection(s)
100 extruder
BD barrel depth
BP barrel pitch
CL channel length
D diameter of the rotor member
d depth
L length of the rotor member
P pitch
RD cross-sectional area of the rotor member

The invention claimed is:

1. A single-screw extruder, comprising:
a cylindrical rotor member having a diameter and a length L;
a feeding zone; and
a feed opening,
the rotor member being arranged in a barrel,
a cylindrical surface of the rotor member carrying cavities and/or projections arranged in helically extending rows,
the helically extending rows of the rotor member having a pitch and depth in the feeding zone of the rotor member, wherein the pitch of a screw is a distance between two consecutive flights, and wherein the feeding zone is that part of the rotor member that is directly under the feed opening and five laps of screw flight following the feed opening,
the extruder further comprising a drive system configured to rotate the rotor member in the barrel, the drive system being located on a drive system side of the single-screw extruder and comprising an electric motor;
wherein a relation of the depth to the diameter of the rotor member, d:D, is not more than 1:20, and
wherein a relation of the pitch of the rotor member to the diameter of the rotor member, P:D, is not more than 1:4.

2. The single-screw extruder as claimed in claim 1, wherein the projections of the rotor member realizes a screw thread comprising at least one screw flight and at least one screw channel between the at least one screw flight, the screw flight having the pitch and the screw channel having the depth.

3. The single-screw extruder as claimed in claim 1, wherein the cavities are separately arranged in the rotor member.

4. The single-screw extruder as claimed in claim 1, wherein the projections are discretely arranged in the rotor member.

5. The single-screw extruder as claimed in claim 1, wherein the rotor member is hollow.

6. The single-screw extruder as claimed in claim 5, wherein the rotor member comprises a cylindrical channel, the diameter of which is at least 75% of the diameter of the rotor member.

7. The single-screw extruder as claimed in claim 1, wherein d:D is in range of 1:300 to 1:20.

8. The single-screw extruder as claimed in claim 1, wherein P:D is in range of 1:60 to 1:4.

9. The single-screw extruder as claimed in claim 2, wherein $$CL \cdot d \leq RD \cdot 0.01, \text{ wherein}$$

CL=channel length measured in direction of length of the rotor member,
d=channel depth measured in radial direction of the rotor member, and
RD=cross-sectional area of the rotor member.

10. The single-screw extruder as claimed in claim 1, wherein the barrel comprises barrel cavities and/or barrel projections arranged in helically extending rows.

11. The single-screw extruder as claimed in claim 10, wherein the barrel cavities and/or barrel projections realize a screw thread comprising at least one barrel flight and at least one barrel channel between the at least one flight, the barrel flight having a barrel pitch and the barrel channel having a barrel depth.

12. The single-screw extruder as claimed in claim 1, wherein the barrel cavities are arranged separately in the barrel.

13. The single-screw extruder as claimed in claim 1, wherein L:D is in range of 2:1 to 4:1.

14. The single-screw extruder as claimed in claim 1, wherein the depth of the cavities and/or projections arranged on the cylindrical surface of the rotor member is arranged to decrease after the feeding zone.

15. The single-screw extruder as claimed in claim 10, wherein the barrel cavities and/or cavities projections are not continuous, such that there are several barrel cavities or grooves side by side.

16. The single-screw extruder as claimed in claim 1, wherein a projected area of the feed opening is 15 cm$^2$-150 cm$^2$ per kilowatt of rotor motor power.

17. The single-screw extruder as claimed in claim 1, wherein the barrel comprises a support structure being arranged outside of the barrel, the support structure comprising
a first support part attached to the barrel between the feed opening and an extruder outlet end of the extruder,
a second support part attached to the drive system side of the extruder, and
a load transmit structure connecting the first support part to the second support part.

18. The single-screw extruder as claimed in claim 1, wherein there is an axial slot arranged between the feeding zone of the barrel and a bearing housing of the extruder for receiving material flowing from the feeding zone backwards.

\* \* \* \* \*